US011449777B1

(12) United States Patent
Sathe

(10) Patent No.: US 11,449,777 B1
(45) Date of Patent: Sep. 20, 2022

(54) SERVERLESS INFERENCE EXECUTION ACROSS A HETEROGENEOUS FLEET OF DEVICES

(71) Applicant: Amazon Technologies, Inc., Seattle, WA (US)

(72) Inventor: Mihir Sathe, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 263 days.

(21) Appl. No.: 16/915,916

(22) Filed: Jun. 29, 2020

(51) Int. Cl.
  *G06N 5/04* (2006.01)
  *G06N 20/00* (2019.01)
  *G06F 9/455* (2018.01)
(52) U.S. Cl.
  CPC ........... *G06N 5/04* (2013.01); *G06F 9/45558* (2013.01); *G06N 20/00* (2019.01); *G06F 2009/4557* (2013.01)
(58) Field of Classification Search
  None
  See application file for complete search history.

(56) References Cited

U.S. PATENT DOCUMENTS

| 10,831,519 | B2 * | 11/2020 | Faulhaber, Jr | G06F 9/5055 |
| 10,949,252 | B1 * | 3/2021 | Krishnamurthy | G06F 9/4881 |
| 11,068,312 | B2 * | 7/2021 | Featonby | G06F 9/5077 |
| 11,126,927 | B2 * | 9/2021 | Stefani | G06N 3/02 |
| 11,301,762 | B1 * | 4/2022 | Chen | G06N 20/00 |
| 2019/0355031 | A1 * | 11/2019 | Cella | G06F 16/182 |

* cited by examiner

*Primary Examiner* — Tri H Phan
(74) *Attorney, Agent, or Firm* — Knobbe, Martens, Olson & Bear, LLP

(57) ABSTRACT

Systems and methods are described for providing for serverless inferences against a trained machine learning (ML) model. Rather than obtaining one or more dedicated devices to conduct inferences, users are enabled to create a task on a serverless system that, when invoked, passing input data to a trained ML model and provides a result. To satisfy varying user requirements for inference speed, the system includes a variety of hardware configurations. The system can efficiently allocate resources between different tasks by invoking the task on a particular hardware configuration that is selected based on a current availability of the selected hardware configuration to host an execution environment in which the task is implemented and an expected time to invoke the task on the individual hardware configuration. The system can therefore efficiently allocate resources among inferences using a variety of different ML models.

20 Claims, 7 Drawing Sheets

SERVERLESS INFERENCE EXECUTION ACROSS A HETEROGENEOUS FLEET OF DEVICES

BACKGROUND

Computing devices can utilize communication networks to exchange data. Companies and organizations operate computer networks that interconnect a number of computing devices to support operations or to provide services to third parties. The computing systems can be located in a single geographic location or located in multiple, distinct geographic locations (e.g., interconnected via private or public communication networks). Specifically, data centers or data processing centers, herein generally referred to as a "data center," may include a number of interconnected computing systems to provide computing resources to users of the data center. The data centers may be private data centers operated on behalf of an organization or public data centers operated on behalf, or for the benefit of, the general public.

To facilitate increased utilization of data center resources, virtualization technologies allow a single physical computing device to host one or more instances of virtual machines that appear and operate as independent computing devices to users of a data center. With virtualization, the single physical computing device can create, maintain, delete, or otherwise manage virtual machines in a dynamic manner. In turn, users can request computer resources from a data center, including single computing devices or a configuration of networked computing devices, and be provided with varying numbers of virtual machine resources.

One possible use of such resources is to conduct machine learning (ML), in which sample data is processed through a machine learning algorithm to generate a mathematical model that, given a new instance of data, can make a prediction or decision regarding that data. Implementation of ML systems includes multiple phases. For example, building a model based on sample data is often referred to as "training" the model: a process whereby an untrained model, which may be generic or relatively generic, is transformed into a trained model. Applying the model to new data in order to make a prediction about that data is sometimes referred to as "inference." In general, training a model is often a time-insensitive, interaction-intensive process, whereby a human operator makes various decisions and selections to arrive at the trained model. In contrast, inference is often a low- or no-interaction process, whereby a system programmatically obtains data, processes it through a model to make an inference, and supplies a result. When used to make real-time decisions (such as in support of providing a service to an end-user), inference is often highly-time sensitive. For that reason, operators often build large, dedicated fleets of devices configured specifically to support inference operations for a particular model. While effective, such fleets can require significant resources to build and operate, inhibiting wide-scale adoption and introducing inefficiency due to the among of unused resources reserved by the fleet.

DETAILED DESCRIPTION

Figure 1:
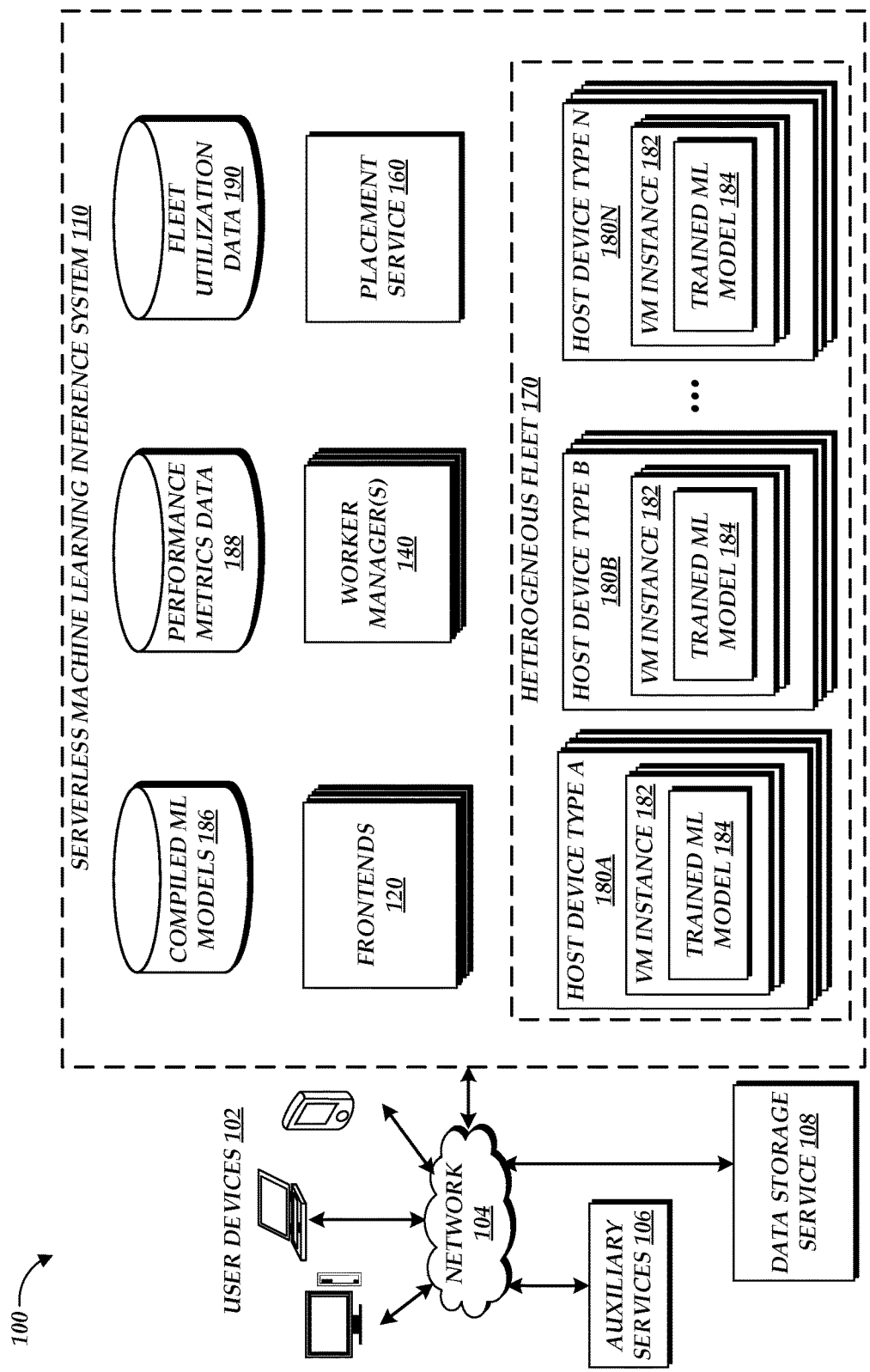
FIG. 1 is a block diagram depicting an illustrative environment in which a serverless machine learning inference system can operate to handle calls to conduct inference against a variety of different trained ML models on-demand, while selecting an efficient physical configuration on which to conduct the inference based on resource utilization of a fleet of devices with heterogenous physical configurations.

Generally described, aspects of the present disclosure relate to a system that enables machine learning (ML) inference operations to be conducted in a serverless manner by a fleet of devices having heterogenous physical configurations. Rather than being specifically configured to support a given ML model, the fleet of devices may be configured to support a variety of models, and to vary which devices support which models over time, according to calls to conduct inference. In this manner, the fleet of devices can operate more efficiently than traditional systems dedicated to conducting inference for a single model, as resources are not required to sit idle when demand for a given model is low, but may rather be dynamically allocated across multiple models. More specifically, and as described in more detail below, the fleet of devices may have a variety of different physical configurations, which vary in their general performance and availability (with more performant configurations generally being expected to have lower availability than less performant configurations, and vice versa). Similarly, end users calling for inference to be conducted may have different requirements for that inference, with some end users demanding more performance (e.g., faster inference) than others. To support these end-user requirements while maintaining availability across the fleet, the serverless ML inference system disclosed herein can be configured to efficiently select a particular physical configuration on which to conduct inference, based on a current resource utilization of the fleet. In this way, utilization of the fleet can be distributed across the various physical configurations, maintaining efficiency of the fleet while ensuring availability to continue to handle calls to conduct inferences.

As used herein, the term "serverless" describes a technique whereby a variety of processing tasks can be completed by a network-accessible service, without requiring a user to first configure or maintain a computing device, either virtual or physical, to support code execution. This lack of need for an end user to maintain a server leads to the term "serverless," though of course the serverless system itself, as opposed to individual users, may maintain servers to support serverless operation. For example, serverless code execution (as described for example in U.S. Pat. No. 9,323,556, entitled "PROGRAMMATIC EVENT DETECTION AND MESSAGE GENERATION FOR REQUESTS TO EXECUTE PROGRAM CODE" and filed Sep. 30, 2014 ("the '556 Patent"), the entirety of which is hereby incorporated by reference) can enable a user to securely execute user-defined code on-demand, without first configuring a computing device to execute that code (e.g., without creating and configuring a virtual machine, installing and configuring an operating system, a runtime, supporting software, on the virtual machine, etc.). Instead, a serverless system can be configured to programmatically, such as at a time of a request to execute the code, generate a machine in which to execute such code, provision the machine with the code, execute the code, provide a result, and potentially to destroy the machine such that resources of the machine are freed for other tasks. Thus, serverless techniques can both decrease an amount of interaction required to execute code while increasing efficiency of that execution by avoiding dedication of computing resources to specific code.

As described herein, such serverless techniques can be extended to conducting inferences on trained machine learning models. Traditionally, conducting inference typically required a user to first configure a computing device, either virtual or physical, to support that inference, such as by provisioning the machine with code to support inference and a trained ML model. By applying serverless techniques to ML inference, these requirements can be removed.

Moreover, in accordance with aspects of the present disclosure, overall efficiency of a serverless ML inference fleet can be improved by enabling dynamic selection, at a time that inference is requested, of a specific physical configuration on which to conduct the inference. In particular, a serverless ML inference system may maintain a heterogenous fleet of devices, with varying physical configurations. For example, the fleet may include devices with varying number of central processing units (CPUs) or CPUs of different architectures, or may include devices with additional processers to aid in ML inference, such as graphics processing units (GPUs) or machine-learning specific processors (e.g., neural processing units (NPUs), tensor processing units (NPUs), etc.). Each physical configuration may vary in performance for a given ML model, with different models potentially performing different on different configurations. Moreover, each configuration may vary in its availability within the fleet, with more performant models typically expected to have lower availability than less performant models. Somewhat similarly, end users may vary in their desired performance for a given inference. For example, one end user may require that inference most often occurs in under 100 ms, while another may accept inferences that on average occur in 500 ms. To satisfy these requirements while maintaining an availability of the fleet, the serverless ML system may dynamically select a particular configuration on which to conduct inference based on a current resource utilization of the fleet.

More specifically, an end user may interact with the serverless ML system in order to create a "task," which represents a process conducted to handle a call to conduct an inference by applying a trained ML model to input data. The user may supply the serverless ML system with a trained model, which can then be stored at the system. The serverless ML system may respond to the request by providing the user with a task identifier. Thereafter, the end user (or other system) can be enabled to submit a call to the serverless ML system with the task identifier and input data, causing the serverless ML system to apply the trained ML model to the input data and provide a result. The serverless ML system may handle aspects such as creating a virtual machine in which to conduct inference, provisioning the machine with the trained model and any code required to conduct the inference, passing the input data to the machine, etc. Thus, user interaction required to conduct inference is greatly reduced.

To support conducting the inference on multiple configurations, the serverless ML system, on receiving a request to create a task, may compile the model for those various configurations. Generally described, ML models can be created in a variety of different frameworks, and as such often require compilation prior to being used to conduct inference on a given physical device. Accordingly, the serverless ML system may conduct this compilation for each of a number of physical configurations supported by its fleet, and store various compiled versions of an end-user supplied ML model, such that compilation need not occur on receiving a request to conduct inference. As used herein, the term "compilation" with respect an ML model can include making the model compatible with a given physical configuration, optimizing the model for implementation on a given physical configuration, or a combination thereof. As would be understood by one skilled in the art, certain configurations of systems may operate most efficiently for particular representations of an ML model. For example, a systolic array processor may include an array of processing elements of a given size (e.g., 128 elements by 128 elements) and configured to quickly perform a series of matrix multiplication operations in order to implement an ML model. Thus, it may be beneficial to compile the ML model such that when implemented on the systolic array processor each matrix multiplication operation uses all (or a large proportion) of the elements of the array. Various other optimizations that vary among physical configurations will be apparent to one skilled in the art. As such, the term "compilation," as used herein, can encompass such optimizations made with respect to a specific physical device configuration.

Moreover, during the process of creating a task, the serverless ML system may request that the user specify a desired performance of the inference, such as in terms of a total time desired for inferences, and a statistical measure for that time (e.g., average of X milliseconds (ms), 99% probability of being under X ms, etc.). The serverless ML system may then test the model across various configurations, in order to determine for each configuration a statistical distribution of performance, such as a distribution of inference time. From these distributions, the system can determine a number of feasible configurations, each feasible configuration corresponding to a particular physical configuration that, according to test data, can support inference in the desired time and according to the desired statistical measure. Accordingly, on receiving a call to conduct inference against the model, the serverless ML system can select from the feasible configurations, thus selecting a given configuration, and conduct the inference on a device of that configuration.

As noted above, the availability of a given configuration may vary across a heterogenous fleet, with a typical expectation that more performant devices have lower availability than less performant devices. Moreover, it is likely that at least some end users will have desired performance requirements that require more performant devices. Thus, potential competition for more performant devices may be assumed to be higher than for less performant devices. To address this, the serverless ML system may assign resource costs to different configurations, reflecting relative scarcity of the configuration in the fleet. (The term "cost," in this context, does not necessarily imply financial cost, but rather is used as a measurement of scarcity with respect to a given computing resource.) As utilization of a resource increases, scarcity and cost may correspondingly increase. In one embodiment, such costs may be assessed in terms of time, e.g., a cost of n per millisecond for a given configuration. While a more performant configuration may incur a higher cost per time unit than a less performant configuration, the more performant configuration may also complete inference more quickly, reducing total cost. The serverless ML system can be configured, on handling a request to conduct inference, to select a particular configuration from the set of feasible configurations for the target model, based on the relative costs of those configurations. The serverless ML system may then conduct inference on the selected configuration, thus ensuring efficient allocation of resources among the fleet.

As will be appreciated by one of skill in the art in light of the present disclosure, the embodiments disclosed herein improve the ability of computing systems, such as serverless systems, to allocate computing resources under conditions of scarcity, preventing individual resource consumers (e.g., tasks) from monopolizing resources and inhibiting operation of the system for other users. Moreover, the presently disclosed embodiments address technical problems inherent within computing systems; specifically, the limited nature of computing resources in handling multiple concurrent processes and the inherent complexities in allocating resources among heterogenous physical configurations. These technical problems are addressed by the various technical solutions described herein, including the programmatic selection of a feasible configuration to use to conduct ML inference based on a current availability of resources in a fleet, as well as previously-determined feasible configurations for the ML inference. Thus, the present disclosure represents an improvement on an on-demand code execution system and computing systems in general.

As used herein, the term "virtual machine instance" is intended to refer to an execution of software or other executable code that emulates hardware to provide an environment or platform on which software may execute (an "execution environment"). Virtual machine instances are generally executed by hardware devices, which may differ from the physical hardware emulated by the virtual machine instance. For example, a virtual machine may emulate a first type of processor and memory while being executed on a second type of processor and memory. Thus, virtual machines can be utilized to execute software intended for a first execution environment (e.g., a first operating system) on a physical device that is executing a second execution environment (e.g., a second operating system). In some instances, hardware emulated by a virtual machine instance may be the same or similar to hardware of an underlying device. For example, a device with a first type of processor may implement a plurality of virtual machine instances, each emulating an instance of that first type of processor. Thus, virtual machine instances can be used to divide a device into a number of logical sub-devices (each referred to as a "virtual machine instance"). While virtual machine instances can generally provide a level of abstraction away from the hardware of an underlying physical device, this abstraction is not required. For example, assume a device implements a plurality of virtual machine instances, each of which emulate hardware identical to that provided by the device. Under such a scenario, each virtual machine instance may allow a software application to execute code on the underlying hardware without translation, while maintaining a logical separation between software applications running on other virtual machine instances. This process, which is generally referred to as "native execution," may be utilized to increase the speed or performance of virtual machine instances. Other techniques that allow direct utilization of underlying hardware, such as hardware pass-through techniques, may be used, as well.

While a virtual machine executing an operating system is described herein as one example of an execution environment, other execution environments are also possible. For example, tasks or other processes may be executed within a software "container," which provides a runtime environment without itself providing virtualization of hardware. Containers may be implemented within virtual machines to provide additional security, or may be run outside of a virtual machine instance.

The foregoing aspects and many of the attendant advantages of this disclosure will become more readily appreciated as the same become better understood by reference to the following description, when taken in conjunction with the accompanying drawings.

FIG. 1 is a block diagram of an illustrative operating environment 100 in which serverless ML inference system 110 may operate based on communication with user computing devices 102, auxiliary services 106, and network-based data storage services 108.

By way of illustration, various example user computing devices 102 are shown in communication with the serverless ML inference system 110, including a desktop computer, laptop, and a mobile phone. In general, the user computing devices 102 can be any computing device such as a desktop, laptop or tablet computer, personal computer, wearable computer, server, personal digital assistant (PDA), hybrid PDA/mobile phone, mobile phone, electronic book reader, set-top box, voice command device, camera, digital media player, and the like. The serverless ML inference system 110 may provide the user computing devices 102 with one or more user interfaces, command-line interfaces (CLI), application programing interfaces (API), and/or other programmatic interfaces for generating and uploading trained ML models, calling for use of the model to conduct inference against input data, and/or viewing other logging or monitoring information related to their requests and/or the model. Although one or more embodiments may be described herein as using a user interface, it should be appreciated that such embodiments may, additionally or alternatively, use any CLIs, APIs, or other programmatic interfaces. The serverless ML inference system 110 may be implemented, for example, by an on-demand code execution system as disclosed for example in the '556 patent.

The illustrative environment 100 further includes one or more auxiliary services 106, which can interact with the serverless ML inference system 110 to implement desired functionality on behalf of a user. Auxiliary services 106 can correspond to network-connected computing devices, such as servers, which generate data accessible to the serverless ML inference system 110 or otherwise communicate to the serverless ML inference system 110. For example, the auxiliary services 106 can include web services (e.g., associated with the user computing devices 102, with the serverless ML inference system 110, or with third parties), databases, really simple syndication ("RSS") readers, social networking sites, or any other source of network-accessible service or data source. In some instances, auxiliary services 106 may be associated with the serverless ML inference system 110, e.g., to provide billing or logging services to the serverless ML inference system 110. In some instances, auxiliary services 106 actively transmit information, such as API calls or other task-triggering information, to the serverless ML inference system 110. In other instances, auxiliary services 106 may be passive, such that data is made available for access by the serverless ML inference system 110. For example, components of the serverless ML inference system 110 may periodically poll such passive data sources, and trigger execution of tasks within the serverless ML inference system 110 based on the data provided. While depicted in FIG. 1 as distinct from the user computing devices 102 and the serverless ML inference system 110, in some embodiments, various auxiliary services 106 may be implemented by either the user computing devices 102 or the serverless ML inference system 110.

The illustrative environment 100 further includes one or more network-based data storage services 108, configured to enable the serverless ML inference system 110 to store and retrieve data from one or more persistent or substantially persistent data sources. Illustratively, the network-based data storage services 108 may enable the serverless ML inference system 110 to store information corresponding to a task, such as compile ML models for the task, sample input data by which to test the task, to retrieve input data to be processed during implementation of a task, and to store information (e.g., results) regarding that implementation. The network-based data storage services 108 may represent, for example, an object storage system, a relational or non-relational database, a network-attached storage (NAS) configured to provide access to data arranged as a file system, or the like. While shown as distinct from the auxiliary services 106, the network-based data storage services 108 may in some instances also represent a type of auxiliary service 106.

The user computing devices 102, auxiliary services 106, and network-based data storage services 108 may communicate with the serverless ML inference system 110 via network 104, which may include any wired network, wireless network, or combination thereof. For example, the network 104 may be a personal area network, local area network, wide area network, over-the-air broadcast network (e.g., for radio or television), cable network, satellite network, cellular telephone network, or combination thereof. As a further example, the network 104 may be a publicly accessible network of linked networks, possibly operated by various distinct parties, such as the Internet. In some embodiments, the network 104 may be a private or semi-private network, such as a corporate or university intranet. The network 104 may include one or more wireless networks, such as a Global System for Mobile Communications (GSM) network, a Code Division Multiple Access (CDMA) network, a Long Term Evolution (LTE) network, or any other type of wireless network. The network 104 can use protocols and components for communicating via the Internet or any of the other aforementioned types of networks. For example, the protocols used by the network 104 may include Hypertext Transfer Protocol (HTTP), HTTP Secure (HTTPS), Message Queue Telemetry Transport (MQTT), Constrained Application Protocol (CoAP), and the like. Protocols and components for communicating via the Internet or any of the other aforementioned types of communication networks are well known to those skilled in the art and, thus, are not described in more detail herein.

The serverless ML inference system 110 is depicted in FIG. 1 as operating in a distributed computing environment including several computer systems that are interconnected using one or more computer networks (not shown in FIG. 1). The serverless ML inference system 110 could also operate within a computing environment having a fewer or greater number of devices than are illustrated in FIG. 1. Thus, the depiction of the serverless ML inference system 110 in FIG. 1 should be taken as illustrative and not limiting to the present disclosure. For example, the serverless ML inference system 110 or various constituents thereof could implement various Web services components, hosted or "cloud" computing environments, and/or peer to peer network configurations to implement at least a portion of the processes described herein.

Further, the serverless ML inference system 110 may be implemented directly in hardware or software executed by hardware devices and may, for instance, include one or more physical or virtual servers implemented on physical computer hardware configured to execute computer executable instructions for performing various features that will be described herein. The one or more servers may be geographically dispersed or geographically co-located, for instance, in one or more data centers. In some instances, the one or more servers may operate as part of a system of rapidly provisioned and released computing resources, often referred to as a "cloud computing environment."

In the example of FIG. 1, the serverless ML inference system 110 is illustrated as connected to the network 104. In some embodiments, any of the components within the serverless ML inference system 110 can communicate with other components of the serverless ML inference system 110 via the network 104. In other embodiments, not all components of the serverless ML inference system 110 are capable of communicating with other components of the virtual environment 100. In one example, only the frontends 120 may be connected to the network 104, and other components of the serverless ML inference system 110 may communicate with other components of the environment 100 via the frontends 120.

In FIG. 1, users, by way of user computing devices 102, may interact with the serverless ML inference system 110 to provide a trained ML model, and establish rules or logic defining when and how such an ML model should be applied to input data on the serverless ML inference system 110 to conduct inference, thus establishing a "task." For example, a user may wish to use a trained ML model to conduct in connection with a web or mobile application that the user has developed. One way of conducting such inference would be to acquire virtual machine instances from service providers who provide infrastructure as a service, configure the virtual machine instances to suit the user's needs, and use the configured virtual machine instances to conduct that inference. In order to avoid the complexity of this process, the user may alternatively provide the trained ML model to the serverless ML inference system 110, and request that the serverless ML inference system 110 execute code to conduct an inference against the ML model using one or more pre-established virtual machine instances. The serverless ML inference system 110 can handle the acquisition and configuration of compute capacity (e.g., containers, instances, etc., which are described in greater detail below) based on a call to conduct inference, and execute code to conduct the inference using the compute capacity. The serverless ML inference system 110 may automatically scale up and down based on the volume, thereby relieving the user from the burden of having to worry about over-utilization (e.g., acquiring too little computing resources and suffering performance issues) or under-utilization (e.g., acquiring more computing resources than necessary to conduct inference, and thus overpaying).

To enable interaction with the serverless ML inference system 110, the system 110 includes multiple frontends 120, which enable interaction with the serverless ML inference system 110. In an illustrative embodiment, the frontends 120 serve as a "front door" to the other services provided by the serverless ML inference system 110, enabling users (via user computing devices 102) to provide a trained ML model, request inference against that model, and view results of such an inference. The frontends 120 include a variety of components to enable interaction between the serverless ML inference system 110 and other computing devices. For example, each frontend 120 may include a request interface providing user computing devices 102 with the ability to upload or otherwise communication trained ML models to the serverless ML inference system 110 and to thereafter request inference against that model. In one embodiment, the request interface communicates with external computing devices (e.g., user computing devices 102, auxiliary services 106, etc.) via a graphical user interface (GUI), CLI, or API. The frontends 120 process the requests and makes sure that the requests are properly authorized. For example, the frontends 120 may determine whether the user associated with the request is authorized to access the ML model specified in the request. In some instances, a user may also supply the serverless ML inference system 110 with code executable to conduct inference against a trained ML model. In other instances, the system 110 may maintain such code for multiple potential types of models, thus negating a need for a user to supply such code.

As discussed above, the system 110 can include a heterogenous fleet 170 of devices 180 on which to conduct inferences. Each device 180 illustratively represents a computing device, which may be a physical device or a virtual device implemented by a physical device. Moreover, the fleet 170 includes various different types of device 180 (shown in FIG. 1 as type A 180A, type B 180B, etc.), each reflecting a different physical configuration. For example, different type of device 180 may vary in their type of CPU (e.g., an x86 or ARM-architecture device), number of CPUs, amount or type of random access memory, or amount or type of other processors (e.g., GPUs, NPUs, TPUs, etc.). In some embodiments, a host device may represent a virtual device supported by multiple underlying physical devices. For example, a host device may be implemented as a virtual machine operating on a first physical device that provides, for example, a virtualized CPU to the host device, and a second physical device that provides, for example, a virtualized GPU or machine-learning specific processor to the host device.

Each host device 180 within the fleet 170 can be configured to support inferences against various trained ML models 184, such as models supplied by user devices 102. In the illustration of FIG. 1, inferences are conducted within virtual machine (VM) instances 182, thus ensuring privacy and security of the inference task. Each VM instance 182 may be configured to support the corresponding trained ML model 184, such as by having an operating system loaded on the instance 182, being provisioned with code to support inference against the model 184, etc. In one embodiment, instances 182 are model-specific, and thus dedicated to conducting inferences against a particular model 184.

Each leased host device 180 may include a number of different VM instances 182 in various states. For example, a VM instance 182 may be active, in that it is executing code (e.g., to conduct an inference) in response to a call to implement a task. Alternatively, a VM instance 182 may be inactive and held in a "warm" state, being loaded with software and pre-defined data required to service a call to implement a task (e.g., an operating system, a runtime, a compiled ML model, etc.) against input data. In some cases, instances 182 may exist in a variety of "semi-warmed" states. For example, a completely warmed instance 182 may be specific to an individual task, and thus pre-loaded with all software and data required to implement the task. A partially warmed instance 182 may be generic among multiple tasks, and be loaded with a set of software and/or data common among the multiple tasks, such that the total software/data required to be loaded into the partially warmed instance 182 is reduced relative to a newly-created instance 182. Each host device 180 may illustratively be configured to maintain instances 182 in a variety of such states, to support rapid implementation of tasks. For example, the mix of instances 182 held by a host may be based on historical analysis of calls to execute tasks on the system 110. Thus, on receiving a call to implement a task, the host device 180, if an active VM instance can rapidly configure an instance 182 to support such implementation.

VM instances 182 may be periodically created or destroyed ("torn down") on host devices 180, enabling efficient use of the resources of host devise 180. For example, on the first call to conduct an inference against a model 184 or when no idle instance 182 for the model 184 exists, the system 110 may create the instance 182 corresponding to the model. When an instance 182 idles for a threshold period of time, the system 110 may destroy the instance 182, thus reclaiming resources of the instance 182.

To execute tasks, the serverless ML inference system 110 includes one or more worker managers 140, which manage execution environments (e.g., virtual machine instances) hosted by physical devices among a heterogenous fleet 170. The worker managers 140—each of which are illustratively implemented as physical or virtual-on-physical devices—illustratively "lease" particular VM instances 182, thus gaining operational control to, for example, instruct virtual machine instances 182 to conduct inference against input data. Thus, on receiving a call to implement a task, a frontend 120 may distribute the call to a worker manager 140, which may identify a currently-leased VM instance 182 in which to implement the task, and cause the instance 182 to implement the task. Example interactions for distributing a call from a frontend 120 to a worker manager 140 are described, for example, in U.S. patent application Ser. No. 16/698,829, entitled "SERVERLESS CALL DISTRIBUTION TO UTILIZE RESERVED CAPACITY WITHOUT INHIBITING SCALING" and filed Nov. 27, 2019, the entirety of which is hereby incorporated by reference.

In the instance that a worker manager 140 does not currently lease a VM instance 182 corresponding to the called task, the worker manager 140 can contact the placement service 160 to request a lease on an additional instance 182, which is illustratively configured to grant to the worker managers 140 leases to individual VM instances 182. Illustratively, the placement service 160 may maintain state information for VM instances 182 across the fleet 170, as well as information indicating which manager 140 has leased a given instance 182. When a worker manager 140 requests a lease on an additional instance 182, the placement service 160 can identify an appropriate instance 182 (e.g., warmed with software and/or data required to support a call to implement a task) and grant to the manager 140 a lease to that instance 182. In the case that such an instance 182 does not exist, the placement service 160 can instruct a host device 180 to create such an instance 182 (e.g., by transforming a partially warmed instance 182 into a fully warmed instance 182, or by creating a new instance 182 and fully warming it) and thereafter grant to the worker manager 140 a lease to that instance 182, thus facilitating execution.

In accordance with embodiments of the present disclosure, the placement service 160 can be configured to select a particular type of host device 180 on which to grant new leases based on an expected resource cost of conducting an inference on that type of device 180.

Specifically, each inference task on the system 110 may be associated with a particular ML model. On creating the task, the system 110 (e.g., via worker managers 140) may create compiled versions of that ML model, each of which corresponds to a different type of host device 180 in the heterogenous fleet 170 (e.g., different architectures, processor types, etc.). The compiled ML models are illustratively stored in the compiled ML models data store 186. The system (e.g., via worker managers 140) may then use the compile ML models to conduct testing on devices 180 of the fleet 170, to estimate an amount of resources required (e.g., an amount of time, bytes processed, etc.) to conduct an inference on various different types of host device 180 in the heterogenous fleet 170.

From these tests, the system 110 may identify feasible configurations for the task, each of which represents a configuration that meets a statistical requirement for inference set by an owner of the task (e.g., a 99% probability of inference occurring in under n milliseconds). For each feasible configuration, an estimate of resource costs may be stored in the performance metrics data store 188.

On receiving a request for a lease of an instance 182 in which to conduct an estimate, the placement service 160 can obtain the estimated resource use amounts for feasible configurations from the performance metrics data store 188, along with fleet utilization data from the fleet utilization data store 190 (which data may be populated, for example, by the host devices 180 on a periodic basis). The placement service 160 can then assign a cost (in terms of resources) to conducting inference in the various feasible configurations. For example, the placement service 160 may assign a cost-per-unit to each different configuration of device 180, reflecting a scarcity of that configuration in the fleet 170 (e.g., with more scarce configurations having a higher cost-per-unit). In one embodiment, the unit is time, though other units (e.g., bytes of data processed) may additionally or alternatively be used. The placement service 160 can then, from the estimated amount of resources required and the cost-per-unit of resource, an estimated cost of conducting inference on various feasible configurations. The service 160 can further select a particular feasible configuration associated with a lowest cost-per-unit of resources. Because the various configurations are selected from feasible configuration, each is estimated to conduct inference according to the task owner's statistical requirements. Moreover, because the particular configuration is selected based on a resource cost specific to the task and reflective of the utilization of various configurations across the fleet 170, selection of a particular configuration in this manner can efficiently allocate resources across the fleet 170, ensuring that the system 110 can support a wide variety of inferences across different ML models.

In some embodiments, the placement service 160 can further monitor resource consumption across the heterogenous fleet 170, to ensure that sufficient availability exists for a given type of host device 180. For example, the placement service 160 may periodically evaluate leased instances 182 to update calculated resource costs for conducting an inference in such instances 182, and evaluate that resource cost against other feasible configurations for conducting that inference. If an alternative feasible configuration is associated with a lower resource cost, the service 160 may cause a new instance 182 to be created on a different type of device 180, and replace the first instance 182 with the second instance 182, thus causing subsequent inferences to occur on the different device 180 configuration. In some cases, to reduce potential increases in latency when altering configuration used to support an inference of a given task, the service 160 may "deprecate" the first instance 182 (e.g., on the higher-resource-cost configuration), which may instruct a worker manager 140 to implement a task in that instance 182 only if no non-deprecated instance 182 is available. Once the new instance 182 (on a lower-resource-cost configuration) has been created and the deprecated instance 182 is inactive, the placement service 160 may revoke leases to that instance 182 and destroy the instance 182, thus freeing resources of that configuration for other tasks.

While the various elements of FIG. 1 are shown individually, each can be implemented across multiple physical computing devices. Alternatively, one or more of these elements can be implemented on a single physical computing device. For example, each of the compiled ML models data store 186, the performance metrics data store 188, and the fleet utilization data store 190 may be implemented as a separate physical data store (e.g., a hard disk drive, solid state disk drive, etc.), or may be implement as a single physical data store logically storing the various types of information described above. In other instances, these data stores are implemented as logical partitions (e.g., "buckets") of the data storage service 108. Although three configurations of device 180 are shown in the example of FIG. 1, the embodiments described herein are not limited as such, and one skilled in the art will appreciate that the serverless ML inference system 110 may comprise any number of types of computing devices 180 in various configurations.

While some functionalities are generally described herein with reference to an individual component of the serverless ML inference system 110, other components or a combination of components may additionally or alternatively implement such functionalities. For example, frontends 120 may operate in a peer-to-peer manner to provide functionality corresponding to the placement service 160, as opposed to including a distinct service 160.

Figure 2:
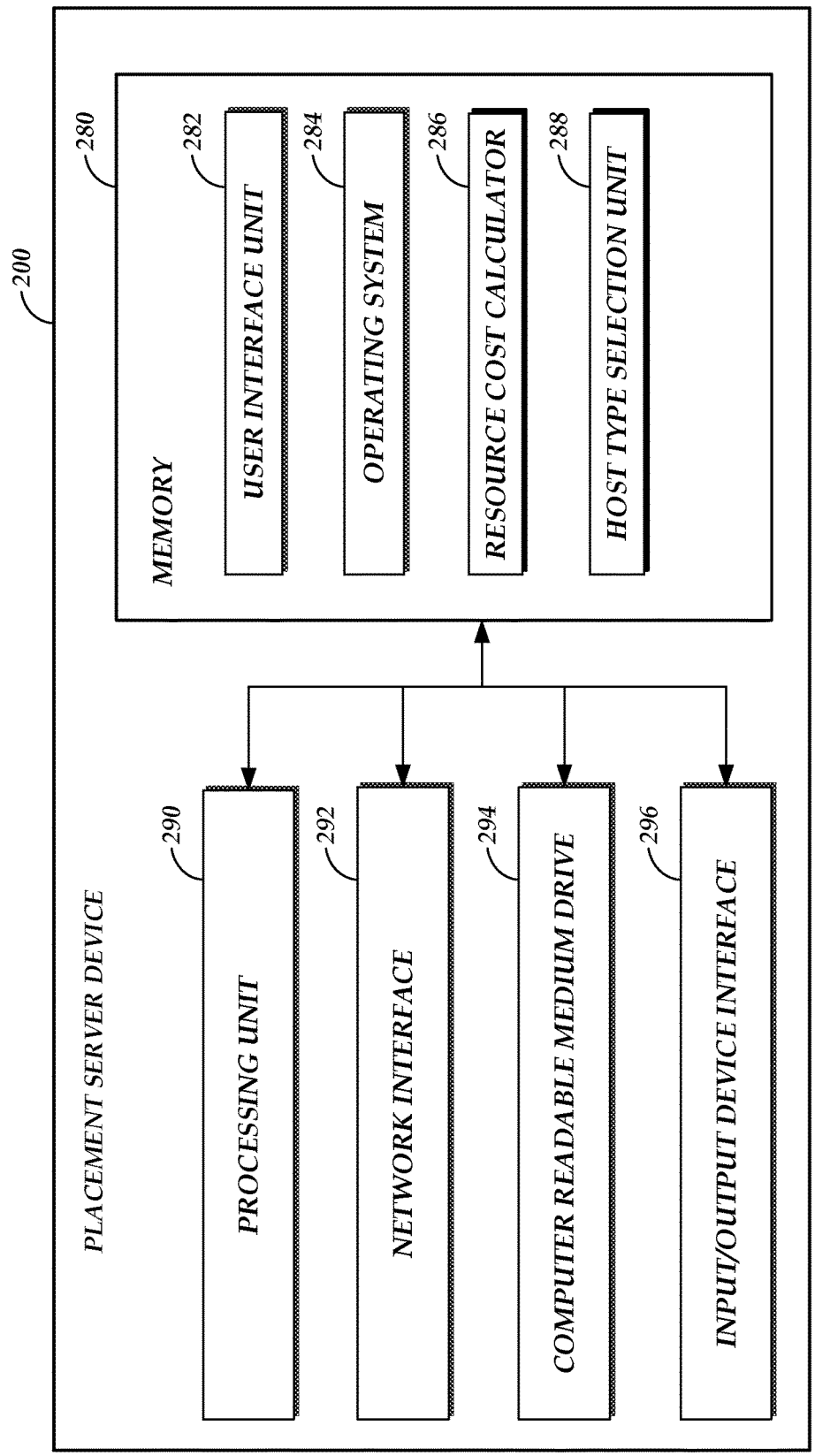
FIG. 2 depicts a general architecture of a computing device providing a worker manager that is configured to selecting an efficient physical configuration on which to conduct the inference based on resource utilization of the fleet of devices of FIG. 1.

FIG. 2 depicts a general architecture of a computing system (referenced as placement server device 200) that implements the placement service 160. The general architecture of the placement server device 200 depicted in FIG. 2 includes an arrangement of computer hardware and software modules that may be used to implement aspects of the present disclosure. The hardware modules may be implemented with physical electronic devices, as discussed in greater detail below. The frontend 120 may include many more (or fewer) elements than those shown in FIG. 2. It is not necessary, however, that all of these generally conventional elements be shown in order to provide an enabling disclosure. Additionally, the general architecture illustrated in FIG. 2 may be used to implement one or more of the other components illustrated in FIG. 1. As illustrated, the placement server device 200 includes a processing unit 290, a network interface 292, a computer readable medium drive 294, and an input/output device interface 296, all of which may communicate with one another by way of a communication bus. The network interface 292 may provide connectivity to one or more networks or computing systems. The processing unit 290 may thus receive information and instructions from other computing systems or services via the network 104. The processing unit 290 may also communicate to and from memory 280 and further provide output information for an optional display (not shown) via the input/output device interface 296. The input/output device interface 296 may also accept input from an optional input device (not shown).

The memory 280 may contain computer program instructions (grouped as modules in some embodiments) that the processing unit 290 executes in order to implement one or more aspects of the present disclosure. The memory 280 generally includes random access memory (RAM), read only memory (ROM) and/or other persistent, auxiliary or non-transitory computer readable media. The memory 280 may store an operating system 284 that provides computer program instructions for use by the processing unit 290 in the general administration and operation of the placement service 160. The memory 280 may further include computer program instructions and other information for implementing aspects of the present disclosure. For example, in one embodiment, the memory 280 includes a user interface unit 282 that generates user interfaces (and/or instructions therefor) for display upon a computing device, e.g., via a navigation and/or browsing interface such as a browser or application installed on the computing device. In addition, the memory 280 may include and/or communicate with one or more data repositories (not shown), for example, to access user program codes and/or libraries.

In addition to and/or in combination with the user interface unit 282, the memory 280 may include a resource cost calculator 286 and a host type selection unit 288 that may be executed by the processing unit 290. In one embodiment, the resource cost calculator 286 is executable to calculate a per-unit (e.g., per-millisecond, per-gigabyte, etc., including combinations of units) cost for utilization of a given configuration of device 180, which costs vary according to availability of that configuration among the fleet 170. The host type selection unit 288 is illustratively executable to select a particular configuration of device 180 on which to implement a task, according to the expected cost of conducting an inference on the type. Thus, the calculator 286 and unit 288 cooperatively execute to implement various aspects of the present disclosure (e.g., the routine of FIG. 6) to allocate resources of the system 110 to various inference tasks.

In some embodiments, the placement server device 200 may further include components other than those illustrated in FIG. 2. For example, the memory 280 may further include a code executable to implement functionalities of a frontend 120, worker manager 140, etc.

Figure 3:
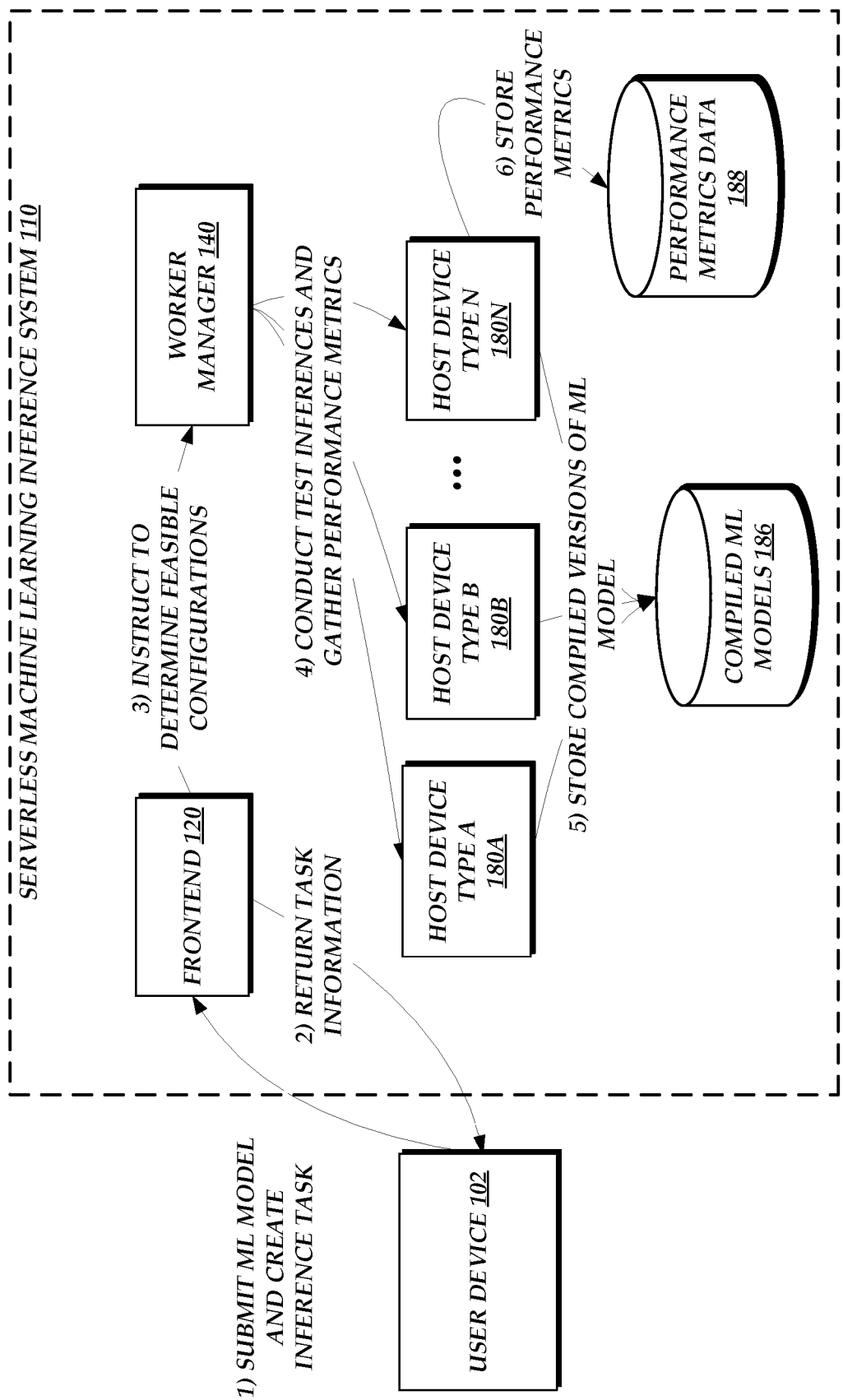
FIG. 3 is a graph depicting illustrative relationships among potential physical configurations of the fleet of devices of FIG. 1.

With reference to FIG. 3, illustrative interactions are depicted for creation of an inference task on the system 110, corresponding to a task to conduct an inference against input data (e.g., supplied at invocation of the task) according to a trained ML model. Accordingly, via the interactions of FIG. 3, an owner of the task, using a user device 102 may create the task such that the task can later be invoked and an inference conducted in a serverless manner, without requiring the owner to maintain a dedicated device on which to conduct such inference.

The interactions of FIG. 3 begin at (1), where a user device 102 submits a request to the frontend 120 to create an inference task. The user device 102 further submits a trained ML model for the task, which the owner may have previously created for the purposes of conducting inferences. A variety of mechanisms for creating such a trained ML model are known in the art, and as such these mechanisms are not described herein.

In response to the request, the frontend 120 can, at (2), return to the user device 102 task information, such as information enabling the device 102 (or other network device) to submit a call to the system 110 with input data and to conduct an inference against the input data using the trained ML model. The information may further include an indication that the system 110 is preparing the task for implementation. While not shown in FIG. 3, the frontend 120 may subsequently (e.g., after the interactions of FIG. 3 complete) transmit an indication to the device 102 that the task is prepared and available to be invoked on the system 110.

In addition, at (3), the frontend 120 transmits to a worker manager 140 an instruction to determine feasible configurations for the task. Accordingly, the worker manager 140, at (4), instructs the various devices 180 to conduct test inferences and gather performance metrics from a variety of configurations of devices 180, shown in FIG. 3 as host devices types A-N, 180A-180N. Conducting test inferences may include, for example, generating and provisioning an execution environment, such as a virtual machine 182, on each host device 180 and gaining a lease to implement a task on such an environment. Illustrative processes for generating, provisioning, and gaining such a lease are described in more detail in FIGS. 5A-B with respect to handling a user-call to implement an inference. However, similar interactions may occur during conducting of test inferences.

In addition, conducting of test inferences may include passing the user-supplied ML model to each type of host device 180, and instructing the device 180 (e.g., within a VM instance 182) to compile the ML model for that particular type of device 180, resulting in a various compiled versions of the user-supplied ML model. These compiled versions may then be stored in the compiled ML models data store 186 and associated with the task. Illustratively, conducting compilation during creation of a task may enable further inferences to be conducted without compilation, speeding up such operations.

Further, conducting of test inferences may include passing to the host devices 180 (e.g., to instances 182 on such devices 180) test input data. In one embodiment, a user device 102 may supply test input data for the ML model. In another embodiment, the system 110 may maintain generic test input data that may be passed to a variety of models. Using the test input data, the host devices 180 (e.g., in various instances 182) can conduct inferences against the trained ML model, in order to measure performance metrics of such inferences. Performance metrics may include, for example, an amount of time in which an inference completed, an amount of data processed, an amount of memory used to conduct an inference, or the like.

In one embodiment, a statistically significant number of inferences is conducted on each type of host device 180, such as 100 inferences, to enable the manager 140 to identify whether the type of device 180 can meet a statistical requirement established by the user during creation of the task. For example, if the user specified that 99% of inferences should complete within 500 milliseconds, the manager 140 may conduct 100 or more test inferences on each type of device 180 in order to determine whether an expected distribution of inference times meets the statistical requirement. Results of gathering performance metrics can then be stored in the performance metrics data store 188. For example, each host 180 may store an indication of whether the type of host 180 met the statistical requirement set by the user, and information on performance metrics gathered during test inferences. The information may include, for example, a distribution of resources used across the tests, statistical measures of that distribution (e.g., an average time, a time in which 99% of test inferences concluded, etc.), or the like.

According to the interactions of FIG. 3, the system 110 can therefore be configured to store compiled ML models for a variety of feasible configurations, as well as performance metrics identifying those feasible configurations and the resources used to conduct inferences on each feasible configuration. As discussed below, this information can thereafter be used to efficiently allocate resources on the system 110, by selecting a configuration in which to conduct an inference based on present availability of the configuration and an expected resource utilization of such an interference.

In some instances, it may be undesirable to conduct test inferences against every possible configuration of device 180. For example, at least some configurations of device 180 may be relatively scarce among the fleet 170, and conducting test inferences in order to determine feasible configurations may further deplete resources of the fleet 170 (where test inferences are expected to be conducted contemporaneously with implementing previously-created inference tasks, for example). Moreover, in some cases, known relationships may exist between different configurations of devices 180. For example, device configurations of the fleet 170 may include broad sub-groups, such as different CPU architectures (e.g., x86 and ARM), with individual configurations having different numbers of CPUs of those architectures (e.g., 2 x86 CPUs, 4 x86 CPUs, etc.). Some configurations may be similar to others, but with additional processors. For example, one configuration may share most aspects with another, but add a dedicated machine learning processor or a dedicated GPU. Accordingly, it may be possible to arrange these configurations into a hierarchy of expected performance.

Figure 4:
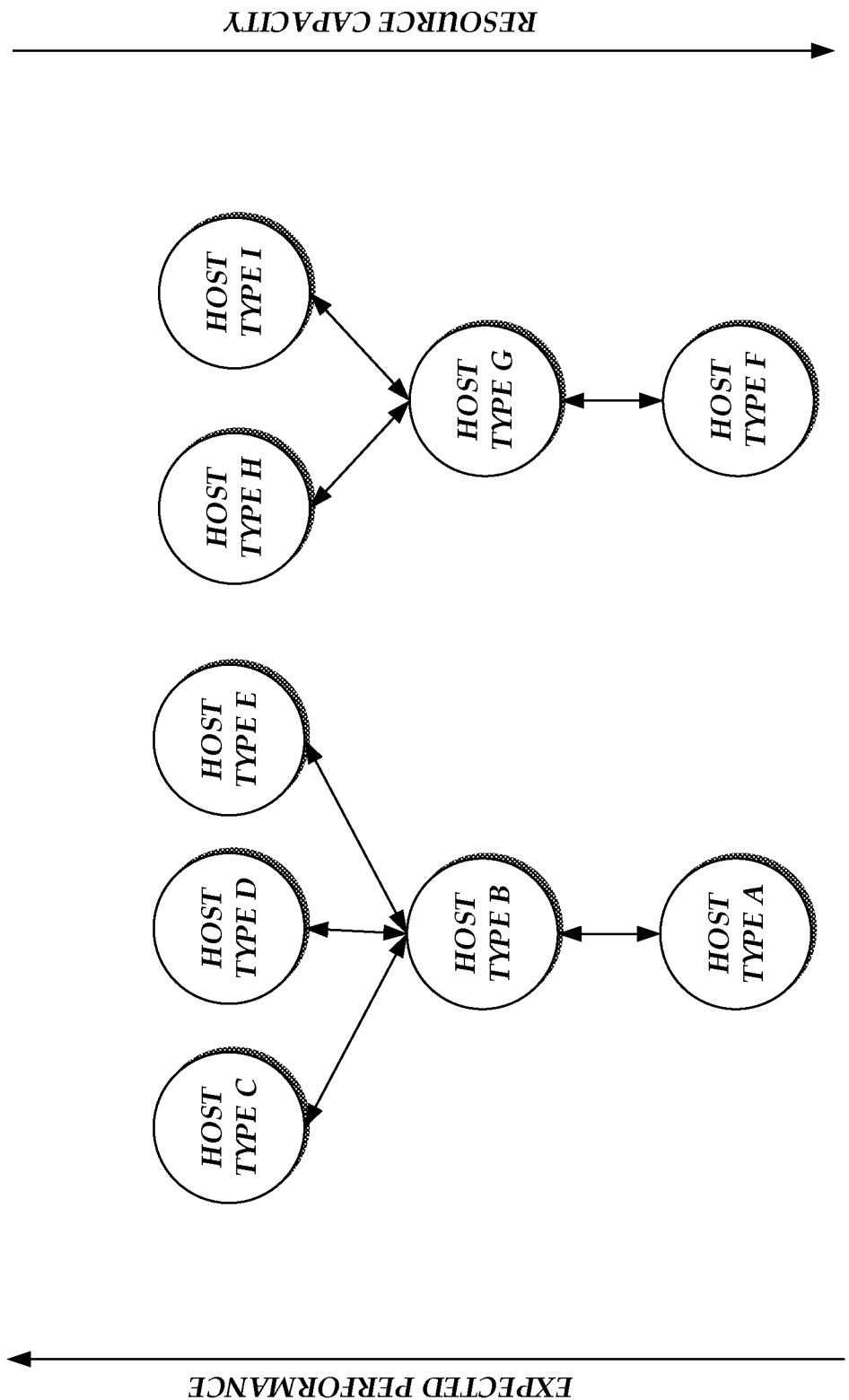
FIG. 4 is a flow diagram depicting illustrative interactions for creating an inference task on the serverless machine learning inference system of FIG. 1, such that inference can be conducted on-demand and on an efficient physical configuration selected based on resource utilization of the fleet.

One example of such a hierarchy is shown in the graph FIG. 4. In the graph, example configurations of the fleet 170 are shown as nodes, with edges indicating a structural relationship between the nodes (e.g., an overlap in configuration). The nodes are illustratively arranged in FIG. 4 according to illustrative expected performance and scarcity, with performance increasing (and capacity inversely decreasing) as indicated. For example, in FIG. 4, the left set of connected nodes may correspond to a first CPU architecture (e.g., x86), while the right set of connected nodes may correspond to a second CPU architecture (e.g., ARM). The bottom nodes may represent a relatively small number of CPU cores, the middle nodes may represent a larger number of CPU cores, and the upper nodes may represent various different additional processors (e.g., GPUs, ML-specific processors, etc.) added on to a configuration of the middle layer of nodes. The number and arrangement of nodes in FIG. 4 is simplified for illustration, and one skilled in the art will appreciate that the graph of FIG. 4 would vary according to the specific physical characteristics of the fleet 170.

To facilitate reduction of the number of test inferences conducted when creating a task, the system 110 may conduct test inferences in a manner informed by the graph of FIG. 4, such as by conducting test inferences on host types A and F initially, and if those types are found to be feasible configurations, avoiding conducting test inferences on types B and G. More specifically, due to the overlap between nodes of the graph, the availability of more performant nodes in the graph can be assumed to be a subset of the availability of connected less performant nodes in the graph. For example, where host type A represents a 2 x86 CPU configuration, each of types B-E may also represent a host with at least 2 x86 CPUs. Accordingly, where host type A is found to be feasible for a given inference, there may be no reason to test host type B (as any host of type B can also be used as a host of type A). Thus, a subsequently more-performant node may be tested for feasibility only if a connected less-performant node is found to be infeasible. In this manner, testing on the most performant nodes may be avoided if a less-performant node is found not to be feasible (e.g., as some groups of configurations may, as a whole, be infeasible for a given model). In other instances, testing may progress from a most-performant configuration to a least-performant configuration, with less-performant nodes being tested only if a prior more-performant node was found to be feasible. In either case, the graph may be "pruned" such that testing need not occur on all configurations.

Figure 5A:
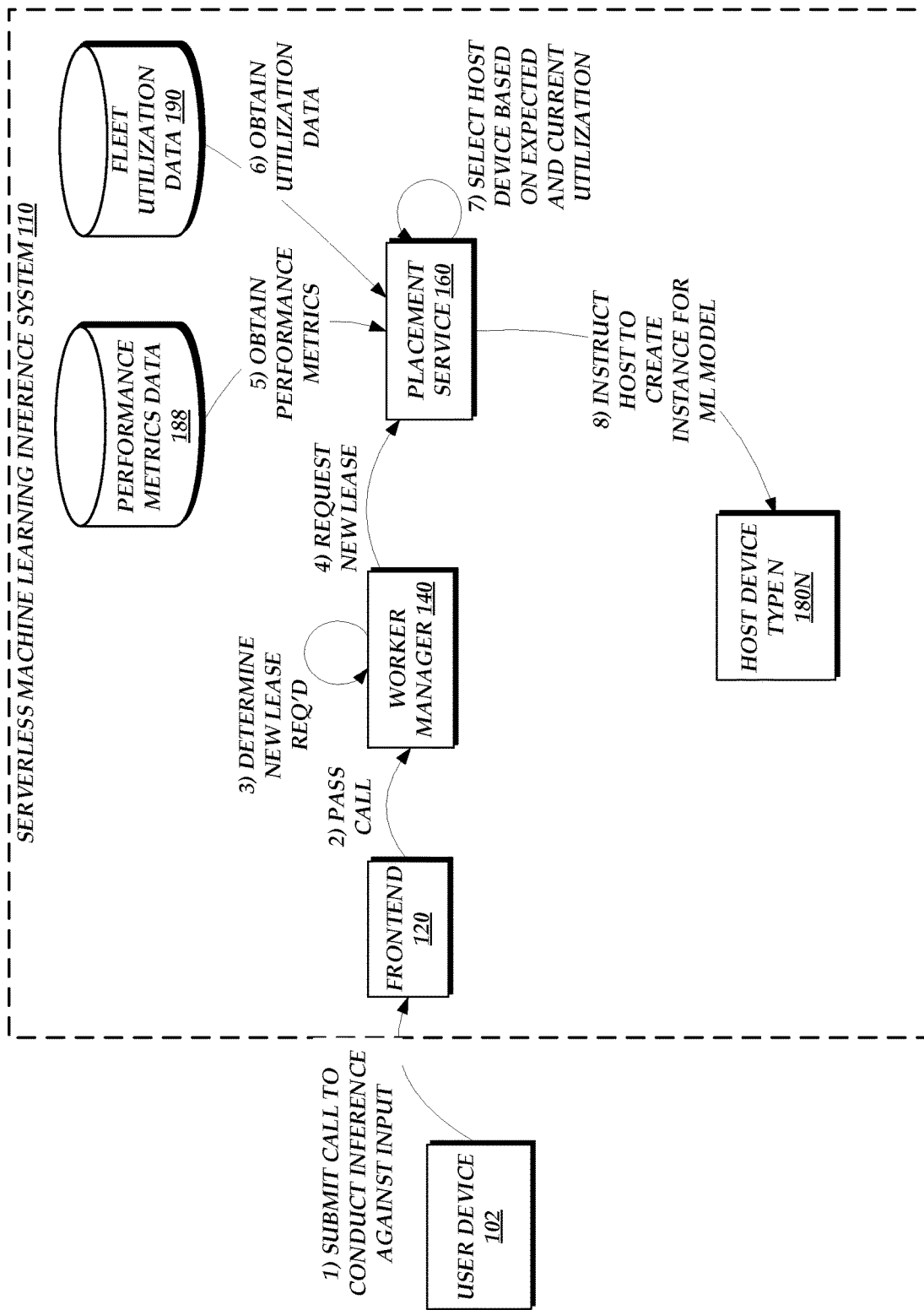
FIGS. 5A and 5B are a flow diagram depicting illustrative interactions for handling a request to conduct inference in the serverless machine learning inference system of FIG. 1 by applying a trained ML model to input data in an execution environment generated on an efficient physical configuration selected based on resource utilization of the fleet.
Figure 5B:
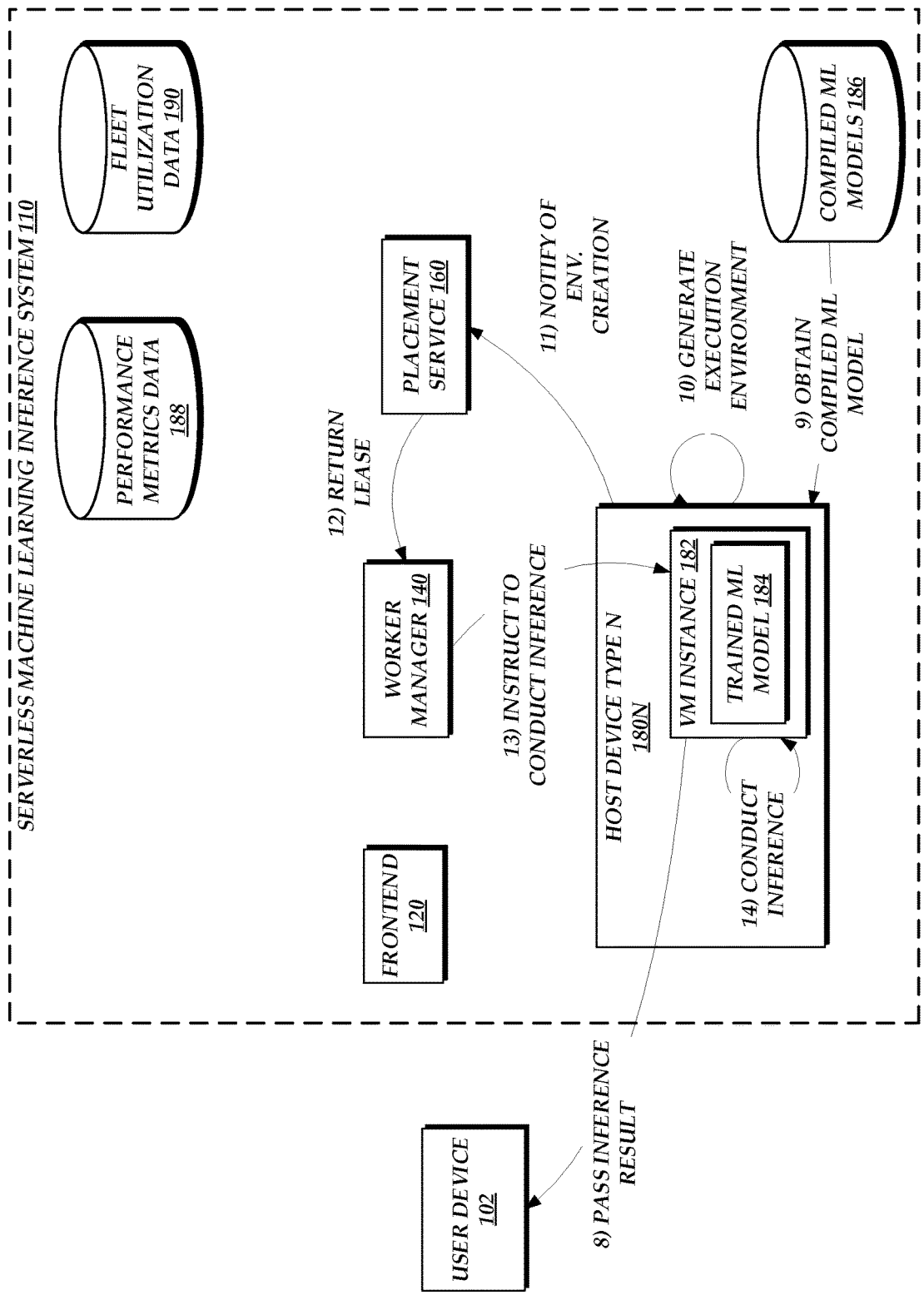

After determining a set of feasible configurations, future calls to invoke a task to conduct inference may be distributed to a particular configuration selected according to current resource availability of the fleet. Illustrative interactions for handling a call to invoke a task to conduct inference are shown in FIGS. 5A-B. While divided into two figures for clarity, the numbering of interactions is maintained across FIGS. 5A-B.

The interactions of FIGS. 5A-B being at (1), where a user device 102 submits a call to the system 110 to conduct an inference against input data. While the call is illustrated as originating at the device 102, the call could be obtained from any network device, or may be generated at the system 110 (e.g., in response to detecting new input data at a network-accessible location, for example). At (2), the frontend 120 passed the call to a worker manager 140.

In general, each worker manager 140 may be configured to maintain a listing of environments (e.g., VM instances 182) leased to the manager 140 and tasks associated with such environments. If a call is obtained to invoke a task and an idle instance 182 associated with that task is currently leased (e.g., if a prior call was processed within a threshold amount of time), the manager 140 can be configured to utilize the leased environment to execute the task. However, for the purposes of illustration, it will be assumed that the manager 140 does not presently lease an idle environment associated with the called task. Thus, at (4), the manager 140 requests from the placement service 160 a new lease for such an environment.

In accordance with embodiments of the present disclosure, the service 160 can thereafter select a configuration of device 180 within the fleet 170 in which to create that environment, based on current availability of various configurations of the fleet 170. Specifically, at (5) and (6), the service 160 obtains performance metrics and utilization data from the performance metrics data store 188 and the fleet utilization data store 190, respectively. As noted above, the performance metrics may indicate, for example, a set of feasible configurations for the task and the expected resource use of conducting an inference in a device 180 of that configuration (e.g., in terms of time). The fleet utilization data may indicate an amount of usage of each configuration of device 180 in the fleet 170 (e.g., in percentage terms, such as a percentage of CPU cycles supporting active task implementations).

While the term "current" utilization is used herein, one skilled in the art will recognize that, in a distributed system, it is generally impossible to maintain at one location perfectly accurate, completely up-to-date information as to the state of multiple devices of such a system. Thus, the term "current" utilization is intended to refer to information with sufficient recency to make decisions regarding the efficient placement of new environments on the system. For example, current information may be information reflecting availability of the fleet in the past 10 minutes, 1 minute, 30 seconds, 10 seconds, etc. Moreover, in some instances, the system 110 may be configured to utilize forecasted information, as opposed to measured information. For example, the system 110 may utilize a forecasting algorithm (a number of which are known in the art) to predict current or future availability from past availability information (e.g., future availability over a period of time in which an inference would be conducted), which may address difficulties of measuring current information within a distributed system.

From the fleet utilization data, the service 160 can determine a present cost-per-unit associated with each feasible configuration. For example, the service 160 may assign cost-per-unit to each configuration according to a present availability of the configuration, with costs increasing as availability decreases. Accordingly, less available configuration may be assigned higher costs than more available configurations. In some embodiments, the cost-per-unit may be selected from a set of pre-defined costs. For example, each configuration may be associated with a cost-per-unit hierarchy, such that when availability of the configuration is below a given threshold, a first cost-per-unit is assigned, when availability is above a first threshold and below a second threshold, a second cost-per-unit is assigned, etc.

Thereafter, at (7), the service 160 selects a configuration, from among feasible configurations for the task, based on the expected performance of conducting an inference on each configuration (in terms of a given unit, such as time) and the cost-per-unit of that configuration. The service 160 can then identify a lowest-cost feasible configuration, and select a host device 180 of that type of configuration in which to generate an environment for implementing the task. Accordingly, at (8), the service 160 instructs the selected host device 180 to create a VM instance 182 for the task, The interactions of FIG. 5A are continued in FIG. 5B, where the host device 180, at (9), obtains from the compiled ML models data store 186 a version of the trained ML model for the task that has been compiled for the configuration of the device 180 (e.g., previously compiled on the device 180 or another device 180 of the same or compatible type). At (10), the device 180 generates an execution environment (specifically, a VM instance 182) for the task, and provisions the instance 182 with the compiled ML model and other software or data required to conduct an inference in the environment (e.g., an operating system, code to conduct an inference against the model, a runtime for such code, etc.).

At (11), the host 180 notifies the service 160 of creation of the environment. The service 160, in turn, returns a lease of the environment to the manager 140. Using that lease, the manager 140 can then, at (13) instruct the instance 182 to conduct the requested inference against the input data. As a result, the instance 182 passes the input data through the trained ML model to generate an inference result, thus conducting the inference at (14). A result of the inference is then passed to the user device 102 at (8).

Accordingly, via the interactions of FIGS. 5A-5B, a user of the device 102 is enabled to submit input data to pass to a trained ML model, and to obtain a result of conducting an inference against that model. From the perspective of the user, these interactions may appear similar to those that would occur with respect to a dedicated fleet of devices to conduct inferences against the model. However, because the environment in which inference is conducted can be created on-demand, inefficiencies associated with maintaining such a dedicated fleet are reduced. Moreover, because the specific configuration of device 180 used to conduct the inference is selected according to a present availability of the fleet 170, the system 110 is enabled to support a wide variety of trained ML models and to distribute load across those devices 180 efficiently, while continuing to meet statistical requirements set by owners of tasks on the system 110.

Figure 6:
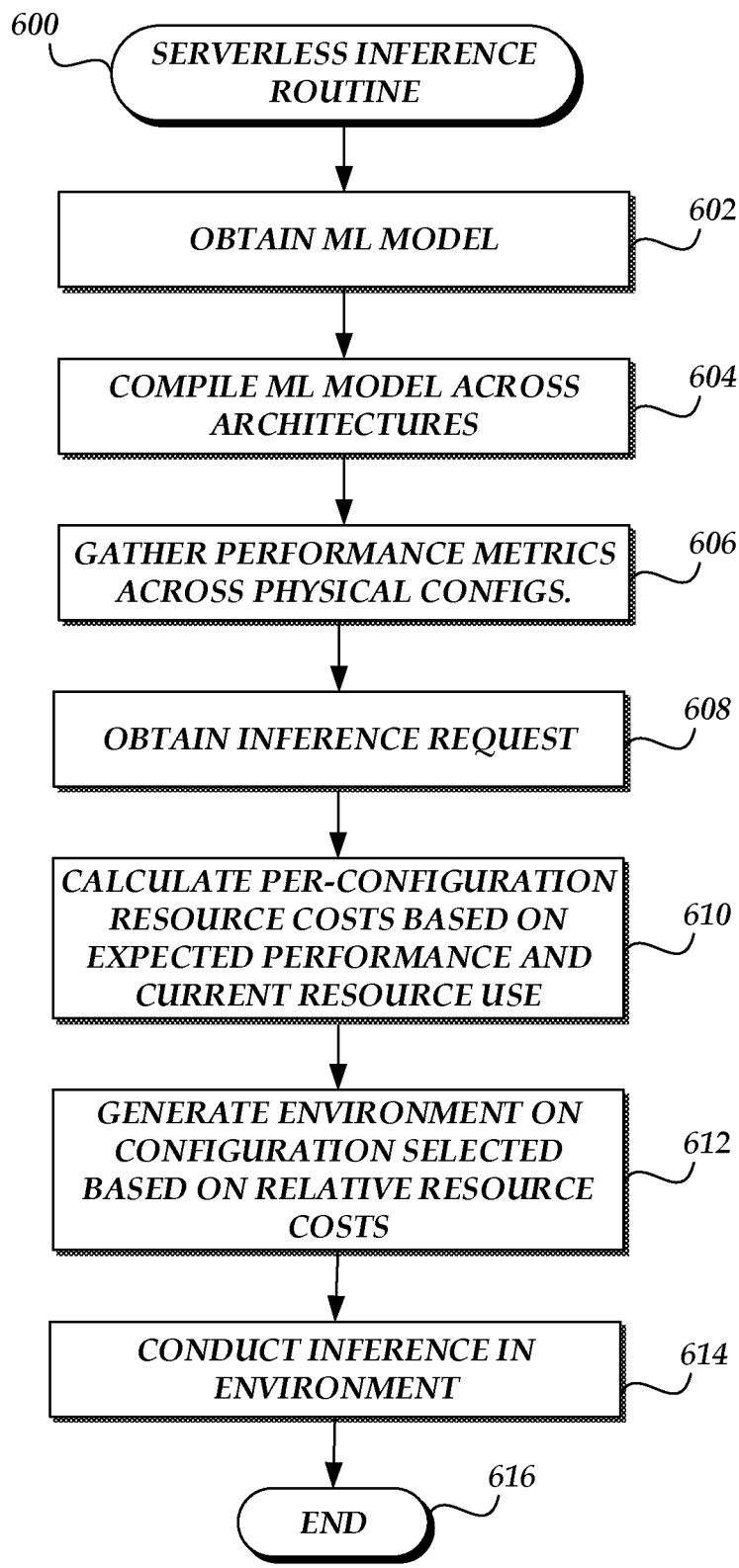
FIG. 6 is a flow chart depicting an illustrative routine for providing inference functionality on the serverless machine learning inference system of FIG. 1.

With reference to FIG. 6, an illustrative routine 600 for providing inferences against input data in a serverless manner will be described. The routine 600 may be implemented, for example, by the system 110 of FIG. 1.

The routine 600 begins at block 602, where the system 110 (e.g., via a frontend 120) obtains a trained ML model to be associated with a serverless task. The model may be supplied, for example, by a user wishing to create the task. During creation of the task, the user may designate other information, such as a statistical requirement for inferences conducted by the system 110 (e.g., 99% of inferences occurring below n ms).

Thereafter, at block 604, the system 110 compiles the ML model across various compilation architectures, such as architectures matching configurations of devices in the fleet 170. In addition, at block 606, the system 110 gathers performance metrics across those physical configurations. Blocks 604 and 606 may include, for example, use of a worker manager 140 to obtain leases to execution environments on host devices of the configurations, and to instruct such environments to conduct compilation and testing with respect to the model. As noted above, testing may include passing of test input data to the model, and determining a distribution of resources used during inferences on the model. From this distribution of resources, a number of feasible configurations may be identified, each feasible configuration corresponding to a type of host device on which inferences can be conducted according to the statistical requirement designated by the user. As noted above, testing may in some instances be conducted according to a hierarchy of device types, such that not all device types need be tested to determine feasible configurations.

At block 608, the system 110 the obtains a request to conduct an inference against the trained ML model. For example, where the user maintains a frontend system that interacts with end users, the frontend system may gather data from the end users and pass that data to the system 110 in order to conduct an inference against that data.

In response, at block 610, the system 110 calculates a per-configuration resource cost for the inference, indicating an expected cost of conducting the inference on each of the feasible configurations. Illustratively, each per-configuration resource cost may be set according to a cost-per-unit of each configuration, which the system 110 can set according to a present availability of the configuration. For example, the cost-per-unit can increase as an availability of the configuration decreases. A total cost of the configuration can then be calculated according to the expected number of units required to conduct the inference. For example, if the unit is time (e.g., milliseconds), the previously-gathered performance data may be used to estimate the time required to conduct the inference (e.g., as an average of a previously-determined distribution). That estimated time may then be combined with an assigned cost-per-millisecond to arrive at an expected cost for conducting the inference on the given configuration. Such a cost for each feasible configuration can then be ordered, and a lowest-cost configuration selected.

Thereafter, at block 612, the system 110 can generate an execution environment, such as a VM instance, on a host device of the selected configuration. The VM instance can illustratively be provisioned with a previously-generated compiled ML model that is compatible with the selected configuration, and with other software or data used to support conducting the inference. At block 614, the system 110 can then conduct an inference in the generated execution environment, thus fulfilling the request to conduct inference while maintaining efficient allocation of resources across the system 110. The routine 600 then ends at block 614.

As noted above, task owners may desire that inferences to complete quickly. As such, it may be desirable to avoid needing to generate an execution environment for an inference at the time of a call. Accordingly, in some embodiments the routine of FIG. 6 may be modified such that blocks 610 and 612 occur only if an existing environment for inference is not currently available (e.g., no idle provisioned environments exist). Moreover, the routine may be modified such that blocks 610 and 612 occur independently of or prior to a request to conduct an inference. Illustratively, blocks 610 and 612 may occur based on a predicted request, such as a request predicted to occur based on creation of a task. Thus, on obtaining a request at block 608, the inference may proceed in a previously created environment, without delay that may be caused by implementation of blocks 610 and 612.

In some instances, calculated per-configuration resource costs may vary over time. For example, an availability of a given configuration may drop, such that the cost of that configuration rises above that of an alternative feasible configuration. However, when an environment on that configuration has previously been created, the system 110 may nevertheless use that environment to conduct an inference. Use of such an environment can beneficially lead to low inference times (as there is no need to create a new environment in the alternative configuration), but may negatively impact efficiency of the system. To address this, in some embodiments the system (e.g., the placement service 160) may be configured to periodically recalculate per-configuration resource costs for an existing set of environments, in a manner similar to block 610, described above. In the instance that a configuration of the environment is not a lowest-cost configuration, the service 160 may mark the current environment as deprecated, and generate a new environment on the lowest-cost configuration (e.g., by "migrating" the data of the current environment). The system 110 (e.g., via each worker manager 140) may be configured to select deprecated environments for inference only in the instance that a non-deprecated environment is not available. The system 110 (e.g., via the placement service 160) may thereafter, such as periodically or after confirming that sufficient non-deprecated environments exist, remove the deprecated environments. Through this process, because higher-cost configurations may still be used until lower-cost configurations become available, existing environments for a task may effectively be shifted from higher-cost configurations to lower-cost configurations without negatively impacting inference times. In this way, efficiency of the system 110 can be maintained without negatively impacting inference latency.

All of the methods and processes described above may be embodied in, and fully automated via, software code modules executed by one or more computers or processors. The code modules may be stored in any type of non-transitory computer-readable medium or other computer storage device. Some or all of the methods may alternatively be embodied in specialized computer hardware.

Conditional language such as, among others, "can," "could," "might" or "may," unless specifically stated otherwise, are otherwise understood within the context as used in general to present that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y or Z," unless specifically stated otherwise, is otherwise understood with the context as used in general to present that an item, term, etc., may be either X, Y or Z, or any combination thereof (e.g., X, Y and/or Z). Thus, such disjunctive language is not generally intended to, and should not, imply that certain embodiments require at least one of X, at least one of Y or at least one of Z to each be present.

Unless otherwise explicitly stated, articles such as 'a' or 'an' should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Any routine descriptions, elements or blocks in the flow diagrams described herein and/or depicted in the attached figures should be understood as potentially representing modules, segments, or portions of code which include one or more executable instructions for implementing specific logical functions or elements in the routine. Alternate implementations are included within the scope of the embodiments described herein in which elements or functions may be deleted, or executed out of order from that shown or discussed, including substantially synchronously or in reverse order, depending on the functionality involved as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A system to provide for serverless inferences against trained machine learning (ML) models, the system comprising:
 a heterogenous fleet of host devices including devices of multiple hardware configurations, wherein the host devices are configured to host virtual machine instances in which the serverless inferences are implemented;
 a data store including availability information for the heterogenous fleet, the availability information identifying a current availability of individual hardware configurations of host devices within the fleet to support serverless inferences; and one or more computing devices configured to:
- obtain a request to create a task on the system, wherein the task when created is invokable to conduct inferences against input data using a trained ML model, and wherein the request specifies a time requirement for inferences conducted via invocations of the task;
- determine a set of feasible hardware configurations for the task, wherein the set of feasible hardware configurations includes hardware configurations of the heterogenous fleet that are determined to satisfy the time requirement;
- obtain an invocation of the task supplying a set of input data;
- calculate a cost of invoking the task on individual hardware configurations of the set of feasible hardware configurations for the task, wherein the cost of invoking the task on an individual hardware configuration is calculated based at least in part on an availability of the individual hardware configuration as reflected in the availability information and on an expected time to invoke the task on the individual hardware configuration;
- generate a virtual machine instance for the task on a host device of the heterogenous fleet having a first hardware configuration of the set of feasible hardware configurations for the task, the first hardware configuration selected from the set of feasible hardware configurations based at least in part on the cost of invoking the task on the first hardware configuration; and
- implement the task in the virtual machine instance, wherein implementing the task comprises loading the trained ML model on the virtual machine instance and passing the set of input data through the trained ML model on the virtual machine instance to generate an inference result.

2. The system of claim 1, wherein individual hardware configuration of the multiple hardware configurations differ in at least one of number of processors or architecture of processors.

3. The system of claim 1, wherein the multiple hardware configurations include at least a first configuration of hardware including a central processing unit (CPU) and an additional processing unit for supporting ML algorithms and a second configuration of hardware including a CPU and excluding an additional processing unit for supporting ML algorithms.

4. The system of claim 3, wherein the additional processing unit is at least one of a graphics processing unit (GPUs) or machine-learning specific processor.

5. A computer-implemented method comprising:
- obtaining a request to create a task on a serverless inference system, wherein the task when created is invokable to conduct inferences against input data using a trained ML model, and wherein the request specifies a time requirement for inferences conducted via invocations of the task;
- determining a set of feasible hardware configurations for the task, wherein serverless inference system includes a heterogenous fleet of host devices including devices of multiple hardware configurations, and wherein the set of feasible hardware configurations includes hardware configurations of the heterogenous fleet that are determined to satisfy the time requirement;
- calculating a cost of invoking the task on individual hardware configurations of the set of feasible hardware configurations for the task, wherein the cost of invoking the task on an individual hardware configuration is calculated based at least in part on i) a current availability of the individual hardware configuration to host an execution environment in which the task is implemented and ii) an expected time to invoke the task on the individual hardware configuration;
- generating the execution environment on a host device of the heterogenous fleet having a first hardware configuration of the set of feasible hardware configurations for the task, the first hardware configuration selected from the set of feasible hardware configurations based at least in part on the cost of invoking the task on the first hardware configuration;
- obtaining an invocation of the task supplying a set of input data; and
- implementing the task within the execution environment, wherein implementing the task comprises loading the trained ML model into the execution environment and passing the set of input data through the trained ML model in the execution environment to generate an inference result.

6. The computer-implemented method of claim 5 further comprising calculating the expected times to invoke the task on individual hardware configurations of the set of feasible hardware configurations, wherein calculating the expected times to invoke the task on an individual hardware configuration comprises implementing the task within an test environment on the individual hardware configuration using test input data and recording a time for the task to complete in the test environment.

7. The computer-implemented method of claim 6, wherein calculating the expected times to invoke the task on the individual hardware configuration further comprises conducting multiple implementations of the task within the test environment and recording a distribution of times for the implementations of task to complete.

8. The computer-implemented method of claim 7, wherein the time requirement for inferences conducted via invocations of the task is indicated as a statistical probability that invocations of the task will complete within a specified period of time, and wherein determining the set of feasible hardware configurations for the task comprises determining that the distribution of times for the implementations of task to complete for each feasible hardware configuration of the set of feasible hardware configurations satisfies the statistical probability.

9. The computer-implemented method of claim 5 further comprising, prior to obtaining the invocation of the task, generating a compiled version of the trained ML model for each feasible hardware configuration of the set of feasible hardware configurations, wherein generating the execution environment comprises provisioning the execution environment with the compiled version of the trained ML model that corresponds to the first hardware configuration.

10. The computer-implemented method of claim 5, wherein generating the execution environment occurs responsive to the invocation of the task.

11. The computer-implemented method of claim 5, wherein generating the execution environment occurs independent of the invocation of the task.

12. The computer-implemented method of claim 5 further comprising detecting that the execution environment has been idle for a threshold period of time and destroying the execution environment.

13. A serverless inference system comprising:
a data store including computer-executable instructions; and
one or more computing devices configured to execute the computer-executable instructions, wherein execution of the computer-executable instructions causes the serverless inference system to:
generate a task on a serverless inference system, wherein the task when generated is invokable to conduct inferences against input data using a trained ML model corresponding to the task, and wherein invocations of the task occur within execution environments hosted by host devices within a heterogenous fleet of the serverless inference system, the heterogenous fleet including devices of multiple hardware configurations;
calculate a cost of invoking the task on individual hardware configurations of the multiple hardware configurations, wherein the cost of invoking the task on an individual hardware configuration is calculated based at least in part on i) a current availability of the individual hardware configuration to host an execution environment in which the task is implemented and ii) an expected time to invoke the task on the individual hardware configuration;
generate the execution environment on a host device of the heterogenous fleet having a first hardware configuration of the multiple hardware configurations for the task, the first hardware configuration selected from the multiple hardware configurations based at least in part on the cost of invoking the task on the first hardware configuration;
obtain an invocation of the task supplying a set of input data; and
implement the task within the execution environment, wherein implementing the task comprises loading the trained ML model into the execution environment and passing the set of input data through the trained ML model in the execution environment to generate an inference result.

14. The serverless inference system of claim 13, wherein execution of the computer-executable instructions further causes the serverless inference system to:
determine a set of feasible hardware configurations for the task, wherein the set of feasible hardware configurations includes hardware configurations of the heterogenous fleet that are determined to satisfy a time requirement for the task; and
wherein to calculate the cost of invoking the task on individual hardware configurations of the multiple hardware configurations, execution of the computer-executable instructions cause the serverless inference system to calculate the cost of invoking the task on individual hardware configurations of the set of feasible hardware configurations for the task.

15. The serverless inference system of claim 14, wherein execution of the computer-executable instructions further causes the serverless inference system to calculate the expected times to invoke the task on individual hardware configurations of the multiple hardware configurations at least partly by implementing the task within test environments on the individual hardware configurations using test input data and recording times for the task to complete in the test environments.

16. The serverless inference system of claim 15, wherein to calculate the expected times to invoke the task on the individual hardware configurations, execution of the computer-executable instructions further causes the serverless inference system to conduct multiple implementations of the task within the test environments and recording distributions of times for the implementations of task to complete.

17. The serverless inference system of claim 16, wherein the time requirement of the task is indicated as a statistical probability that invocations of the task will complete within a specified period of time, and wherein to determining the set of feasible hardware configurations for the task, execution of the computer-executable instructions further causes the serverless inference system to determine that the distribution of times for the implementations of task to complete for each feasible hardware configuration of the set of feasible hardware configurations satisfies the statistical probability.

18. The serverless inference system of claim 13, wherein the execution environment is a first execution environment, and wherein execution of the computer-executable instructions further causes the serverless inference system to, subsequent to generation of the execution environment on the host device having the first hardware configuration:
recalculate the cost of invoking the task on individual hardware configurations of the multiple hardware configurations;
determine that a second hardware configuration of the multiple hardware configurations is associated with a lower cost than the first hardware configuration;
generate a second execution environment of a host device of the heterogenous fleet having the second hardware configuration; and
subsequent to the second execution environment being generated, destroy the first execution environment.

19. The serverless inference system of claim 13, wherein execution of the computer-executable instructions further causes the serverless inference system to, prior to obtaining the invocation of the task, generating a compiled version of the trained ML model for individual hardware configurations of the multiple hardware configurations, wherein, to generate the execution environment, execution of the computer-executable instructions causes the serverless inference system to provision the execution environment with the compiled version of the trained ML model that corresponds to the first hardware configuration.

20. The serverless inference system of claim 13, wherein execution of the computer-executable instructions further causes the serverless inference system to detect that the execution environment has been idle for a threshold period of time and destroy the execution environment.

* * * * *